United States Patent

[11] 3,619,495

[72] Inventors Yutaka Ito
Saitama-ken;
Jun Hirate, Tokyo; Takeshi Saito,
Kawasaki-shi, all of Japan
[21] Appl. No. 851,802
[22] Filed Aug. 21, 1969
[45] Patented Nov. 9, 1971
[73] Assignee Nippon Electric Company, Limited
Tokyo, Japan
Tokyo Broadcasting System
Tokyo, Japan

[54] TELEVISION PICTURE MONTAGE CIRCUIT

10 Claims, 3 Drawing Figs.

[52] U.S. Cl. .......... 178/6.8, 178/DIG. 6
[51] Int. Cl. .......... H04n 5/22
[50] Field of Search .......... 178/6.8

[56] References Cited
UNITED STATES PATENTS
2,969,428 1/1961 Wittlig .......... 178/DIG. 6

*Primary Examiner*—Robert L. Griffin
*Assistant Examiner*—Richard K. Eckert, Jr.
*Attorney*—Sandoe, Hopgood and Calimafde

ABSTRACT: A method and apparatus are described for the preparation of a common television program signal from different line scan signals. Line scan signals are generated such as of the conventional video type employed in the transmission of television programs. Each line scan signal has a like period and is applied along different channels for combination after passing through variable gain channel amplifiers. Control voltages are generated for the gain control of the channel amplifiers. The control voltages are produced from a keying signal and a composite keying signal which pass through variable gain circuits to produce directly related and complementary related outputs. Correspondingly related outputs are added with the added signals applied through a switching network for varying the gain of the channel amplifiers. By selectively controlling the keying signal particular time portions of each line scan may be controlled in the common television program signal for the superimposing of several programs. Gradual control may be obtained by varying the gain of the variable gain circuits with faders.

Figure 1:
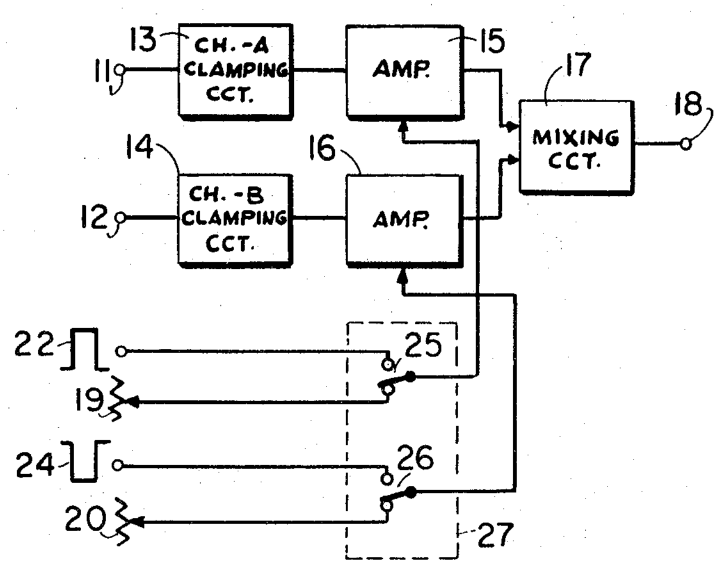

*INVENTORS*
YUTAKA ITO
JUN HIRATE
TAKESHI SAITO by Sandoe, Hopgood & Calimafde
ATTORNEYS.

INVENTORS
YUTAKA ITO
JUN HIRATE
TAKESHI SAITO
by Sandoe, Hopgood & Calimafde
ATTORNEYS.

TELEVISION PICTURE MONTAGE CIRCUIT

This invention relates to a television picture montage circuit for attaining special effects on the picture, such as the superposition of another picture.

It has been believed that a video-signal-mixing amplifier for mixing, fading-in, fading-out, and similar treating of video signals is different from a video-signal-gating amplifier for keying, wiping, and likewise dealing with video signals. One reason for this belief is that the clamping circuits are not necessary for the mixing amplifier while indispensable for the gating amplifier. Inasmuch as a certain number of such amplifiers is indispensable to compose a program for a television broadcast, it has been necessary to provide a number of switch buses for the signal sources of these amplifiers. Furthermore, a distortion of the video signals has been inevitable as a result of the many cascaded amplifier stages the signals have to pass through. In color television broadcast, color burst phase compensation which must be carried out at various stages has greatly inconvenienced the system design of program production facilities including the mixing amplifiers and the gating amplifiers and increased the latter's expense.

It is therefore an object of this invention to provide a television picture montage circuit which may be used either as a conventional video-signal-mixing amplifier or as a conventional video-signal gating amplifier by the mere selection of control voltage.

It is a further object of the invention to provide a television picture montage circuit of the kind whereby it is possible to simplify the video-signal channels.

It is still further an object of the invention to provide a video amplifier of the kind which reduces the number of stages requiring color burst phase compensation for color video signals.

It is still further an object of the invention to provide a video amplifier to attain in a simple manner special picture effects which are often called for particularly in color television broadcast.

It is still another object of this invention to provide a method of combining television pictures for a television program.

A television picture montage circuit in accordance with the invention includes video signal clamping circuits for clamping the pedestal levels of video signals of several signal channels to be combined and gain-controlled video amplifiers for adjusting the amplitudes of the respective outputs of said video clamping circuits. Amplitudes are adjustable from zero (corresponding to cut off) to a predetermined finite value. The gain of said video amplifiers is determined by control voltages supplied thereto. A video-signal-mixing circuit is provided for adding the outputs of said gain-controlled video amplifiers. Means for supplying the control voltages to said gain-controlled video amplifiers provides for the varying of the amplitude of the video signal over the whole picture area as well as for varying the amplitude of the video signal over a selection portion of the picture area.

Figure 2:
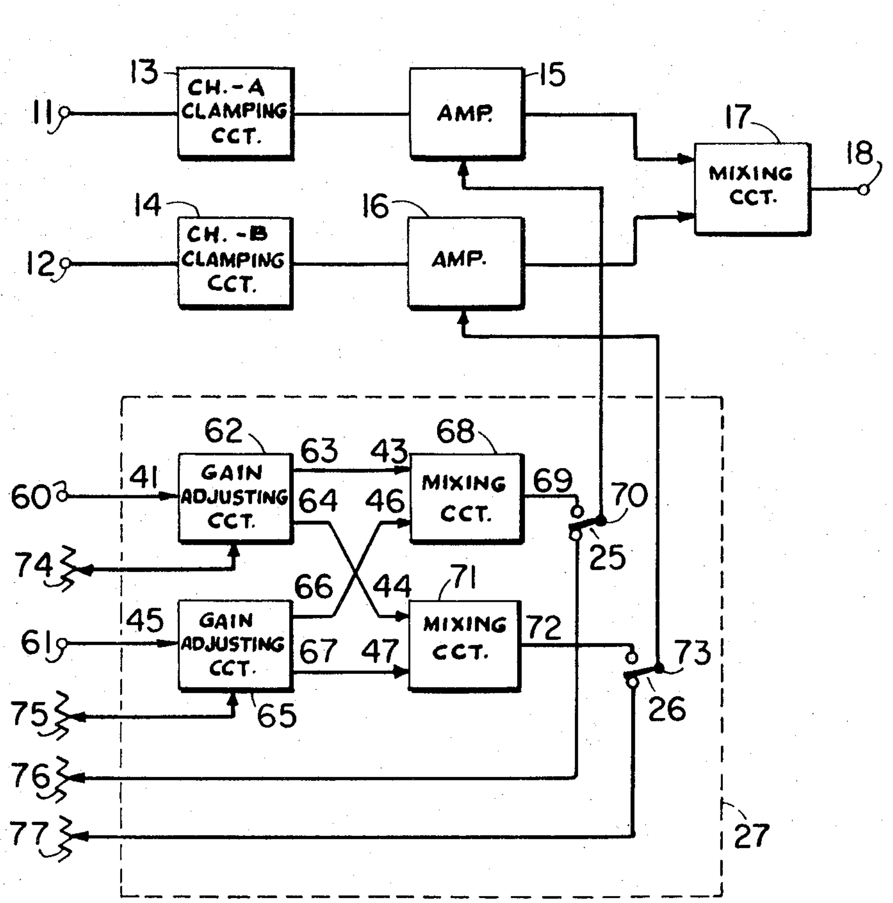

Now the invention will be described with reference to the accompanying drawings in which:

FIG. 1. is a block diagram of a first embodiment of the invention;

FIG. 2. is a similar diagram of a second embodiment of the invention; and

Figure 3:
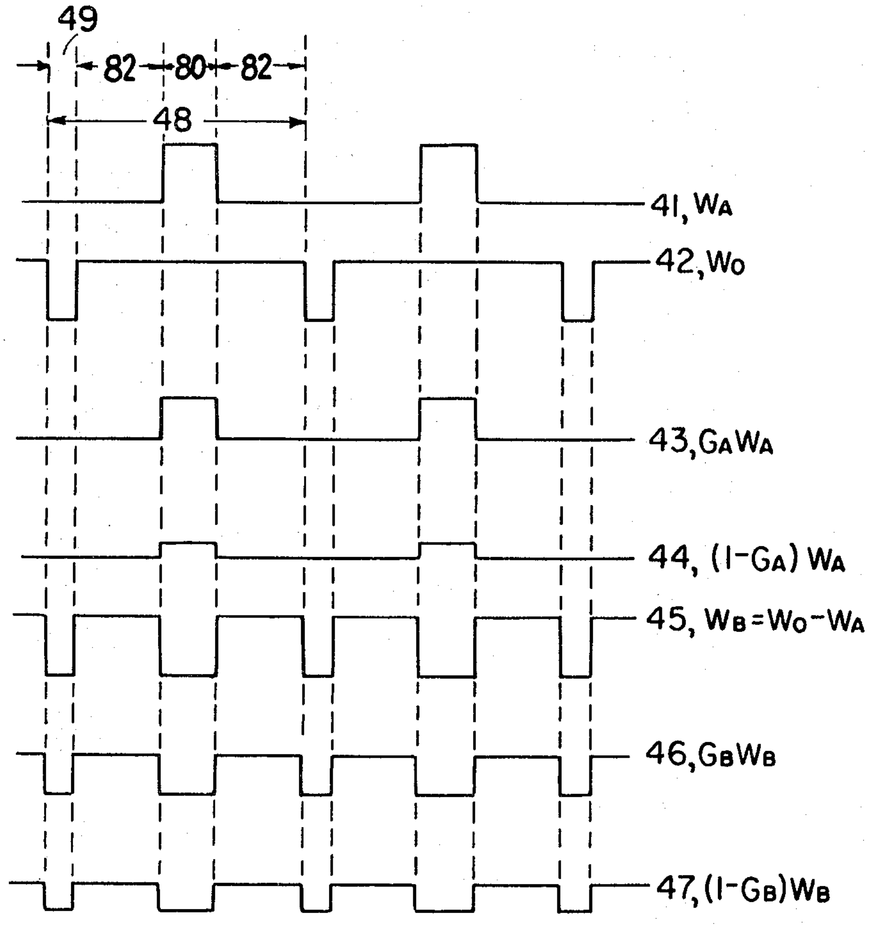

FIG. 3. is a waveform diagram for signals appearing at various parts of the second embodiment.

With reference to FIG. 1, a first embodiment of the invention is shown wherein a video amplifier performs the functions of a conventional mixing amplifier and a gating amplifier. Video signals from a first channel A and a second channel B are supplied to channel A and channel B video signal input terminals 11 and 12, respectively. The pedestal levels of these video signals are clamped by channel A and channel B clamping circuits 13 and 14, respectively, to a predetermined potential. These clamping circuits 13 and 14 are provided to eliminate pedestal disparities between the pedestal levels of the respective video signals. Such pedestal disparity represents a difference between the average picture levels of the respective input video signals and becomes displeasingly apparent when a switchover between the video signals is made.

The outputs of the channel A and the channel B clamping circuits 13 and 14 are respectively coupled to a channel A and a channel B gain-controllable video amplifier 15 and 16. The outputs of amplifiers 15–16 are added by a video-signal-mixing circuit 17 and then delivered to a video signal output terminal 18. Control voltages are generated either from direct-current control elements, known as faders, and which generate control voltages 19 and 20 representative of desired fade-in and fadeout functions, or from keying pulses 22 and 24. These control voltages are coupled to the video amplifiers 15 and 16 through channel A and channel B control-voltage switches 25 and 26, respectively, to control the gains of these amplifiers. As symbolically depicted by a dashed-line rectangle showing a control-voltage switching circuit 27, the control-voltage switches 25 and 26 are ganged to one another. The keying pulses 22 and 24 are of opposite polarity and each has "on" and "off" levels which furnish the gain-controlled video amplifier with a predetermined finite gain or cutoff gain, respectively.

With the switches 25 and 26 placed as shown in FIG. 1, the direct-current control voltages 19 and 20 act as control voltages which place the video amplifiers into a conventional video-signal-mixing operation. In such mixing operation, video signal levels of the respective channels A and B are varied over the entire time cycle of the video signals including their blanking periods by adjustment of the faders, which may fade out the picture of one channel and fade in the picture of the other channel. When switches 25 and 26 are reversed, the keying pulses 22 and 24 serve as the operating control voltages so as to render the video amplifiers as conventional video-signal gating amplifiers wherein the video signal levels of the respective channels are interchanges (as apparent at terminal 18) at that portion of the picture frame area which is bounded by the rise and fall portions of the keying pulses 22 or 24.

Referring to FIG. 2, a second embodiment of the invention is shown wherein a video amplifier is provided which performs the dual functions of video-signal mixing and dissolve-gating, wherein signal insertions are carried out by dissolve. The input terminals 11 and 12, the clamping circuits 13 and 14, the gain-controlled video amplifiers 15 and 16, mixing circuit 17, output terminal 18, and control signal switches 25 and 26 have the same function and mutual relation as in the first embodiment of FIG. 1, while the control-voltage switching circuit 27 is furnished with functions additional to those performed by the circuit of FIG. 1.

With the control-voltage switches 25 and 26 in FIG. 2 thrown in the positions as illustrated, the second embodiment serves as a conventional video-signal-mixing amplifier as will be described. If the switches 25 and 26 are reversed, this video amplifier functions as a conventional video-signal dissolve-gate amplifier as will be explained hereunder.

With reference to FIG. 3, circuit waveforms are shown which are necessary to operate the second embodiment of FIG. 2 as a dissolve-gate amplifier. A keying signal 41 having an amplitude $W_A$ is applied to terminal 60 for gating one or the other of the channel A and the channel B video signals. For the sake of simplicity of description, it is presumed for the present that the signals shown here are of rectangular waveform having only "on" and "off" levels, although the keying signal 41 may be, for example, the channel B video signal. Likewise, a train of the horizontal blanking pulses 42 are presumed available from conventional sources for the channel A and the channel B video signals and have an amplitude of $W_0$. The amplitude $W_0$ is preliminarily made equal to the amplitude $W_A$. The amplitude $W_A$ of the keying signal 41 is further adjusted in a keying signal gain adjusting circuit 62 to be described hereunder so as to become gain-adjusted keying signals 43 and 44 whose amplitudes are $G_A \cdot W_A$ and $(1-G_A) \cdot W_A$, respectively, where $G_A$ $(0 \leq G_A \leq 1)$ is the gain of the gain adjusting circuit 62.

A composite keying signal 45 is provided at terminal 61 and has an amplitude of $W_B$ adjusted to equal $W_O - W_A$. Typically, the composite keying signal 45 is derived by superposition of the blanking pulse train 42 on phase-inverted keying signal 41. The amplitude $W_B$ of the composite keying signal 45 is adjusted in a composite keying signal gain-adjusting circuit 65 so that the composite keying signal 45 may become gain-adjusted composite keying signals 46 and 47 whose amplitudes are $G_B \cdot W_B$ and $(1-G_B) \cdot W_B$, respectively, where $G_B$ $(0 \leq G_B \leq 1)$ is the gain of the latter gain-adjusting circuit 65. The time interval 48 represents a single horizontal scanning period for a video signal, and another time interval 49 represents a horizontal blanking period which may or may not include the periods of color burst. It is apparent for those skilled in the art that the blanking periods include a vertical blanking period, while not shown in the figure. It is to be noted here that no portion of the keying signal 41 occurs during the blanking periods.

Returning to FIG. 2, the keying signal 41 is applied through a keying signal input terminal 60 connected to a keying signal gain-adjusting circuit 62, from which two gain-adjusted keying signals 43 and 44 are derived on output connections 63 and 64, respectively. Likewise, the composite keying signal 45 is supplied through a composite keying signal input terminal 61 connected to a composite keying signal gain-adjusting circuit 65, from which two gain-adjusted composite keying signals 46 and 47 are obtained on output connections 66 and 67, respectively. The set of gain-adjusted signals 43 and 46 correspond with one another in that their respective amplitudes $G_A \cdot W_A$ and $G_B \cdot W_B$ relate in like manner to the gain of the circuits 62 and 65. The signals 43 and 46 appear on the output connections 63 and 66 and are added by channel A keying signal mixing circuit 68, from which a channel A control voltage is delivered to the channel A gain-controlled video amplifier 15 through a channel A control voltage connection 69, the channel A control voltage switch 25, and another channel A control voltage connection 70.

In a similar manner, another set of corresponding gain-adjusted signals 44 and 47 having respective amplitudes of $(1-G_A) \cdot W_A$ and $(1-G_B) \cdot W_B$ appear on the respective output connections 64 and 67 and are summed by a channel B keying-signal-mixing circuit 71, from which a channel B control voltage is fed to the channel B gain-controlled video amplifier 16 through a first channel B control voltage connection 72, the channel B control voltage switch 26, and a second channel B control voltage connection 73. Gain-adjusting voltages for the keying signal and the composite keying signal gain-adjusting circuits 62 and 65 are obtained from faders 74 and 75, respectively, as direct current-control voltages. The keying-signal-mixing circuits 68 and 71 clamp the signals appears in the channel A and the channel B control voltages during the horizontal blanking periods 49 to such respective reference levels as are necessary to cut off the outputs of the related gain-controlled video amplifier 15 or 16. The maximum and the minimum voltages of the channel A control voltage as adjusted by one or both of the faders 74 and 75 give the maximum and the minimum gains of the related gain-controlled video amplifier 15, respectively. In a similar manner, the maximum and the minimum voltages of the channel B control voltage as adjusted in accordance with the adjustment of the channel A control voltage give the maximum and the minimum gains of the related gain-controlled video amplifier 16, respectively.

Accordingly, it is possible to effect, within the picture area determined by the keying signal 41, such as during the pulse 80, a cross-fade or dissolve. This may be accomplished by adjusting only fader 74 which independently may accomplish the fade while the gain $G_B$ of amplifier 65 is still at unity.

Likewise, it is possible to achieve a crossfade from the channel B to the channel A picture within the rest of the picture area as indicated at 82 by adjusting the gain $G_B$ of the circuit 65 from zero (cutoff gain) to unity while keeping the gain $G_A$ at zero (cutoff gain).

In a practical situation where channel A represents a background picture and channel B represents letters to be superimposed thereon, one may utilize the channel B video signal itself for the keying signal 41. It then becomes possible by operation of the fader 74 to effect the superimposing of the letters by dissolve and to leave, as the dissolve is completed, the letters inserted through the gate.

With the direct-current control voltages provided by channel A and channel B faders 76 and 77, the video amplifiers 15 and 16 are controlled through the control-voltage switches 25 and 26. This latter control operates the embodiment of FIG. 2 as a conventional video-signal-mixing amplifier whereby the whole picture areas of the channel A and channel B pictures may be interchanged.

As may be understood from the above description, this invention makes it possible to interchange the video-signal level with another signal over any portion of the video signal except the blanking periods. Such interchange may be obtained by a normally all white but amplitude-variable blanking video signal as a keying signal. Moreover, it is possible to use ordinary video signals or any alternating-current signal as the keying signal to effect the gating. Furthermore, it is possible to change the video signal levels over whole periods of the video signal except the blanking periods or within the picture area determined by the keying signal by changing the clamping reference levels of the channel A and channel B keying-signal-mixing circuits 68 and 71. In addition, one skilled in the art may apply the above-described principles of the invention to a video amplifier accommodating three or more channels with three or more control voltages.

While the principles of the invention have been described in connection with specific apparatus, it is to be clearly understood that this description is made only be way of example and not as a limitation to the scope of the invention as set forth in the objects thereof and in the claims.

We claim:

1. A television picture montage circuit comprising variable-gain video amplifiers for amplifying video signals in different video channels, the gain of each video amplifier being adjustable between a cutoff gain and a predetermined finite value by a control voltage supplied thereto, a video-signal mixing circuit for adding the outputs of said video amplifiers, video clamping circuits for clamping the pedestal level of video signals to be supplied said gain-controlled video amplifiers, and means for selectively supplying said video amplifiers with a first control voltage for varying the respective gains thereof for whole picture area control, and means for selectively supplying said video amplifiers with a second control voltage to vary the respective gains thereof for selected portion control of the picture area.

2. A television picture montage circuit as claimed in claim 1, wherein said second control-voltage-supplying means further comprises a keying signal gain adjusting circuit supplied with a keying signal to produce, under the control of a direct-current control voltage, a pair of complementary gain-adjusted keying signals, a composite keying signal gain adjusting circuit supplied with a composite keying signal produced by superimposing of a blanking signal on a phase-inverted keying signal to produce, under the control of another direct-current control voltage, a pair of complementary gain-adjusted composite keying signals, a first channel keying signal mixing current supplied with one of said gain-adjusted keying signals and a corresponding one of said gain-adjusted composite keying signals, and a second channel keying signal mixing circuit supplied with the other of said gain-adjusted keying and composite keying signals, said keying signal mixing circuits producing the second control signals for said respective gain-controlled video amplifiers.

3. A television picture montage circuit comprising video signal clamping circuits for clamping pedestal levels of video line scan signals in different channels, gain-controlled video amplifiers for amplifying respective outputs of said video signal clamping circuits, the gain of said video amplifiers being adjustable between a cutoff gain and a predetermined finite value by control voltages supplied thereto, and a video-signal mixing circuit for adding the outputs of said video amplifiers, a keying signal gain-adjusting circuit supplied with a keying signal to produce, under the control of a first direct-current control voltage, a pair of complementary related gain-adjusted keying signals, a composite keying signal gain-adjusting circuit supplied with a composite keying signal produced by superimposing a blanking signal employed with line scan signals on a phase-inverted keying signal, said composite keying signal gain-adjusting circuit producing, under the control of a second direct-current control voltage, a pair of complementary related gain-adjusted composite keying signals, a first channel keying signal mixing circuit supplied with one of said gain-adjusted keying signals and a corresponding one of said gain-adjusted composite keying signals, and a second channel keying signal mixing circuit supplied with the others of said gain-adjusted keying and composite keying signals, said keying signal mixing circuits producing the control signals for said gain-controlled video amplifiers.

4. A device for combining different television program signals applied from different channels wherein each channel includes a periodic video line scan signals comprising video channel amplifiers respectively coupled to the video line scan signals and having variable gain inputs, a video line scan signal-combining circuit for combining outputs from said video channel amplifiers, first means including a first keying amplifier supplying a first video channel amplifier variable gain input with a first control voltage to selectively vary the gain thereof during a first portion of each period of a line scan, and second means including a second keying amplifier supplying a second video channel amplifier variable gain input with a second control voltage to selectively vary the gain thereof during the remaining portion of said line scan period, wherein said first means includes a keying amplifier having a variable gain input coupled to a first gain adjusting voltage and being driven by a keying signal in synchronization with the line scan video signals, said keying amplifier providing first complementary output signals representative of a desired gain of said video channel amplifiers, and wherein said second means includes a composite keying signal amplifier having a variable gain input coupled to a second gain adjusting voltage and being driven by a composite keying signal in synchronization with the line scan video signals, said composite amplifier providing second complementary output signals representative of a desired gain of said video channel amplifiers and wherein said first and second means further include mixing circuit means having inputs thereto connected to said keying amplifiers for adding corresponding signals from said keying and composite keying signal amplifiers to provide first and second video channel amplifier gain control voltages coupled to said first and second variable gain inputs on the video channel amplifier.

5. The device as recited in claim 4 wherein said mixing circuit adding means includes means for clamping the level of a blanking signal included in said composite keying signal.

6. The device as recited in claim 5 and further including means for generating DC control voltages, said DC control voltages varying the gain of said video channel amplifiers for entire line scan periods, and switching means for selectively coupling the outputs of said adding means and said DC control voltages to said video amplifier variable gain inputs.

7. A method of combining different television program signals present in different channels wherein each channel includes periodic video line scan signals comprising the steps of providing a keying signal synchronized with the video line scan signals, providing a composite keying signal synchronized with the video line can signals, separately amplifying the keying and composite keying signals to provide directly dependent and complementary dependent amplified outputs of each signal, combining said directly dependent amplified keying and composite keying signals, combining said complementary dependent amplified keying and composite keying signals, respectively controlling the gain of channel amplifiers with respective combined keying and composite keying signals wherein the channel amplifiers are used to amplify line scan signals of different channels, and combining the outputs of the channel amplifiers to form a common television program signal.

8. The method as recited in claim 7 and further including the step of providing one of the television program video line scan signals as the keying signal.

9. The method as recited in claim 7 wherein the amplifying step is accompanied with the step of selectively varying the magnitude of the amplification employed with the keying and composite keying signals in accordance with the channel desired in the common television program signal.

10. The method as recited in claim 9 wherein the keying signal includes a portion selectively placed within each line scan period to be selectively employed in the line scan of the common television program signal.

* * * * *